United States Patent [19]
Veldman

[11] 4,315,340
[45] Feb. 16, 1982

[54] METHOD AND APPARATUS FOR MAKING A SELF-THREAD CREATING FASTENER

[76] Inventor: Donald R. Veldman, 9517 S. Ridgeland Ave., Oak Lawn, Ill. 60453

[21] Appl. No.: 195,603

[22] Filed: Oct. 9, 1980

Related U.S. Application Data

[62] Division of Ser. No. 934,365, Aug. 17, 1978, Pat. No. 4,235,149.

[51] Int. Cl.$^3$ .......................... B21H 3/02; B21H 3/08
[52] U.S. Cl. .............................. 10/10 R; 10/152 T; 72/88; 411/416
[58] Field of Search ............... 10/10 R, 141 R, 152 T; 72/88, 90, 469, 470; 411/416, 418, 417

[56] References Cited

U.S. PATENT DOCUMENTS

| | | | |
|---|---|---|---|
| 3,171,146 | 3/1965 | Moss et al. | 411/422 X |
| 3,180,126 | 4/1965 | Carlson | 411/416 X |
| 3,209,383 | 10/1965 | Carlson | 411/416 X |
| 3,772,720 | 11/1973 | Yamamoto | 411/416 X |
| 3,878,759 | 4/1975 | Carlson | 411/416 |
| 4,040,328 | 8/1977 | Muenchinger | 411/416 X |
| 4,136,416 | 1/1979 | Thomas | 72/469 X |

*Primary Examiner*—Howard N. Goldberg
*Assistant Examiner*—Timothy V. Eley
*Attorney, Agent, or Firm*—Fitch, Even, Tabin, Flannery & Welsh

[57] ABSTRACT

A thread forming screw having a helical thread and a tapered lead-in section with a polygonal cross section is formed from a conventional blank by rolling the blank between a pair of thread rolling dies having means thereon to form alternating convex lobes and concave relief areas in the frusto-conical surface of the blank. Thus, the screw may be formed with a polygonally shaped threading end without a prior working of the blank's frusto-conical surface. Curved ramp surfaces smoothly interface the lobes and concavities to allow metal in a workpiece being threaded to roll into the concavities thereby reducing the torque needed to form a thread in the workpiece.

13 Claims, 16 Drawing Figures

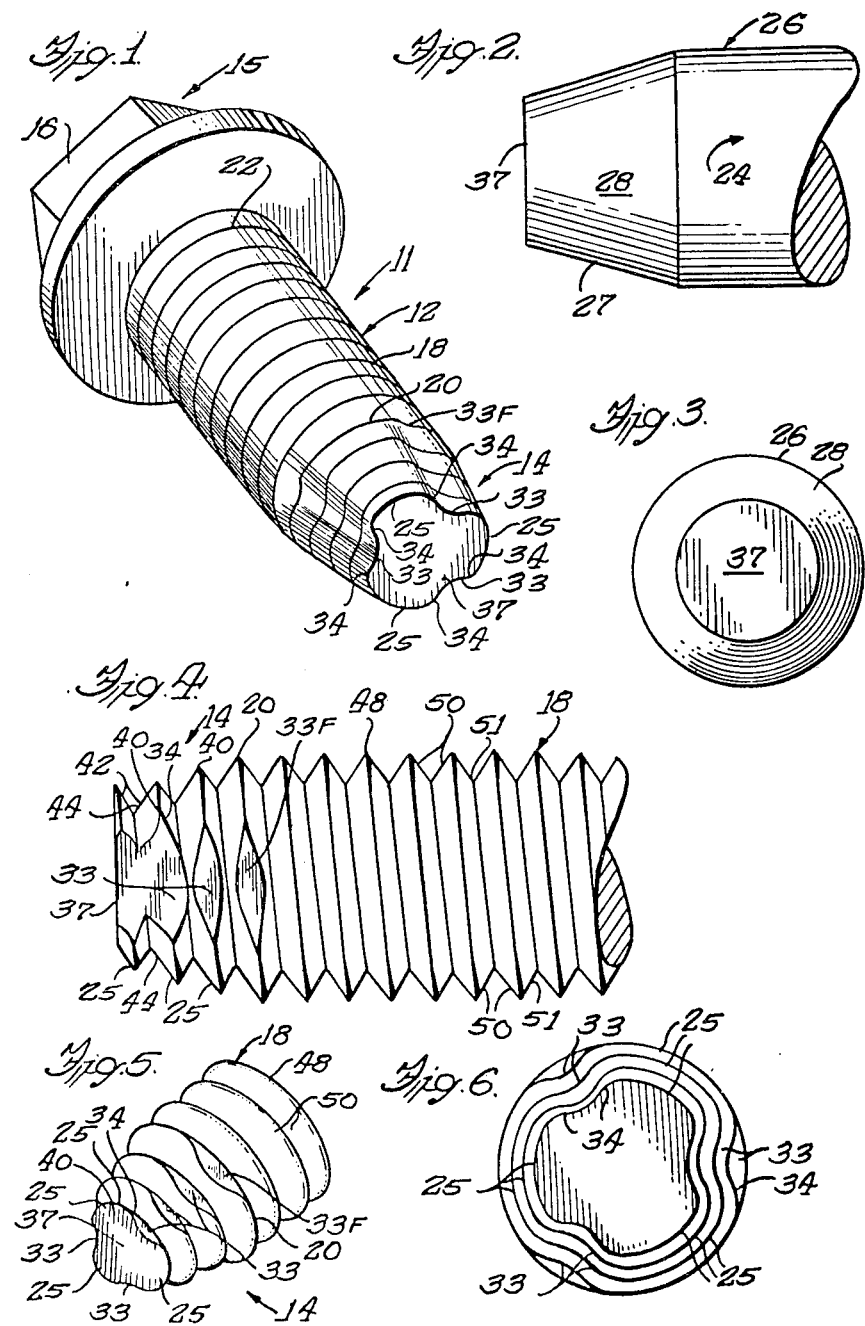

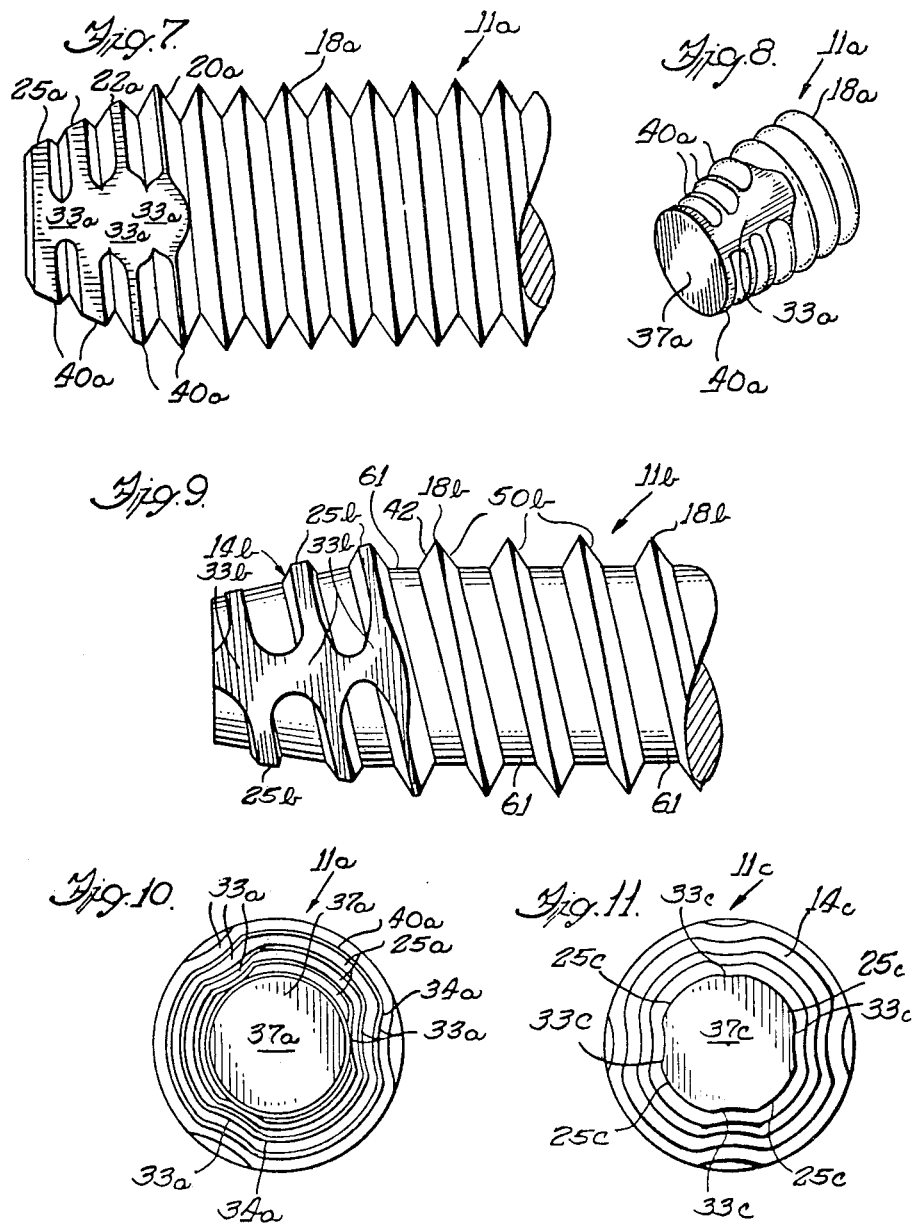

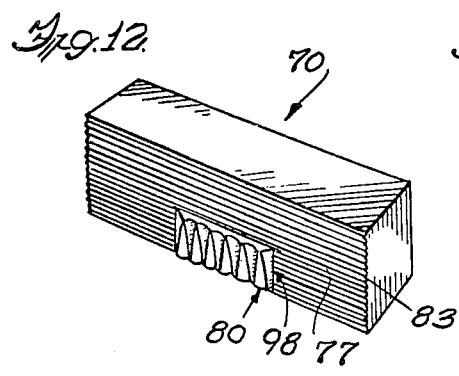
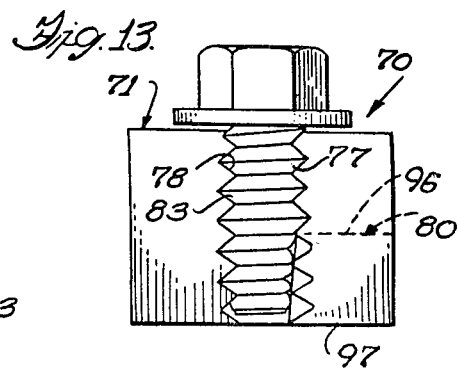
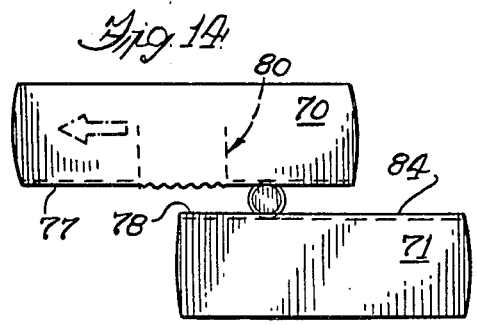
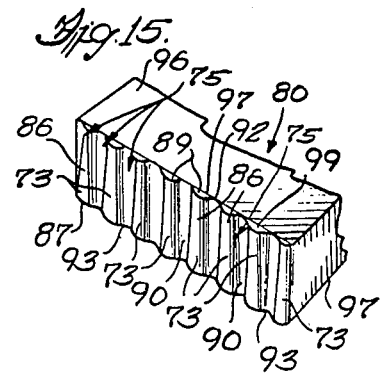
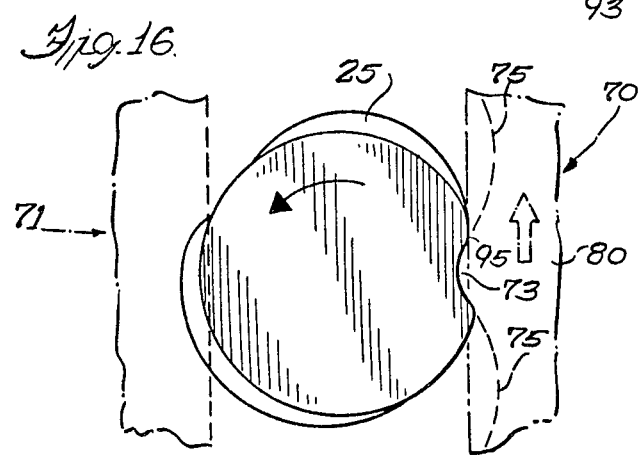

METHOD AND APPARATUS FOR MAKING A SELF-THREAD CREATING FASTENER

This is a division of application Ser. No. 934,365, filed Aug. 17, 1978, now U.S. Pat. No. 4,235,169.

This invention relates to self thread creating fasteners and further to a method and an apparatus for making the same.

BACKGROUND OF THE INVENTION

The present invention is directed to self-thread creating fasteners which have a driving means at one end connected to a cylindrical shank with helical threads thereon extending to a tapered lead-in section having thread-forming lobes thereon. The thread-forming lobes are inserted into a preformed aperture usually in metal and then the screw is turned to create a thread in the aperture. Usually, the cylindrical shank has a continuous helical thread thereon which provides a constant diameter thread providing high breakaway torque. Typically, these thread-forming fasteners produce their own thread in the workpiece without removal of material from the workpiece, consequently there is thorough absence of chips during the assembly operation.

To provide a lower initial driving torque for forming the thread during the initial thread-forming operation by the leading section, a number of proposals have been provided including that of forming flats onto the conical tapered lead-in section prior to rolling a screw thread. For instance, U.S. Pat. No. 3,218,656 discloses a fastener blank having a conical end which is extruded, usually in a cold header, to form four symmetrically arranged and spaced, flattened or relief sides leaving narrow tapered curved sections between the flattened sides. Subsequently, during a thread rolling operation, the helical thread is formed on the shank of the blank and lobes are formed in the lead-in section for cutting a thread. Such a screw is costly to manufacture in the sense that it requires a separate cold working operation to flatten the sides of the conical end prior to rolling of the lobes on the lead-in section. Such flattening operations are hard on the tools and the cost of tooling may be quite high. Thus, these fasteners are more costly than those which are formed without having any such flats on the lead-in section. Additionally, this fastener results in essentially flat reliefs between most of the lobes which have so-called blunt, non-cutting leading swagging edges. The relief areas between the lobes are stated to gradually merge from a flat to a dished area in a direction away from the end of the screw. Further, the circumferential extent of the flat relief decreases in the direction away from the fastener end resulting in high driving torques as the fastener thread forming operation progresses.

Other cross sections, for example, triangular cross sections, have been proposed for the tapered, thread-forming end, as disclosed in U.S. Pat. No. 3,246,556. Here, again, a prior forming operation is needed to produce the trilobular cross section in the blank, upon which the helical threads are formed in the thread rolling operation.

Another proposal which is stated to eliminate the need to preform the tapered lead-in section into a polygonal shape is disclosed in U.S. Pat. No. 4,069,730 wherein a conical tapered lead-in section is roll threaded to provide a series of circumferentially spaced lead-in lobes having a convex bare root therebetween. That is, there is a substantially arcuate convex section between the lobes which does not provide as good a radial relief as does the radial reliefs in some other fasteners.

Another form of prior art self threading fastener is formed from a trilobular wire which is formed with a head thereon thereby providing a trilobular shank and tapered, lead-in section. An interrupted or non-continuous thread is formed on the shank as well as the lead-in section. While such a construction provides a good, easy threading action because of the radially-directed relief formed between the lobes at the conical lead-in section, the interrupted thread on the main shank provides a lower holding torque which is not desired in many applications. These trilobular blanks are more expensive than the cylindrical blank with a conical end.

Thus, there is a need to be able to make an inexpensive fastener from a conventional blank to form a polygonally shaped lead-in section with good radial relief in the lead-in section and with a complete and continuous thread on the main shank.

SUMMARY OF THE INVENTION

In accordance with the present invention, a blank having a cylindrical shank and a tapered leading end section is rolled to provide a continuous helical thread on the straight shank portion and a polygonal shape on the tapered lead-in section with concave radial relief areas or sections between the circumferentially-spaced lobes. In this rolling process, the metal which is in the tapered lead section is rolled smoothly and radially outwardly to provide smooth concavities with the displaced metal being pushed radially outwardly and circumferentially into smoothly blended thread-forming lobes which project above the former tapered surface. The thread creating fastener is thus provided with a polygonal shape with radially relieved concavities between the thread forming lobes to provide a screw which requires a very low driving torque and yet has a continuous thread to provide a high breakaway torque holding power of a bolt or the like. Preferably, a relief concavity is provided in at least the first full thread of the continuous helical thread to aid in the transition from the lead-in section to the full thread thereafter.

Accordingly, a general object of the present invention is to provide a new and improved thread-forming screw of the foregoing kind.

A further object of the invention is to provide a novel method and apparatus which forms a cylindrical shank with a tapered lead-in section into a thread-forming screw having a continuous helical thread on the major shank and a thread forming leading end section with spaced lobes having concavities extending into the former tapered end section to provide torque-relieving capabilities.

BRIEF DESCRIPTION OF THE DRAWINGS

These and other objects of the invention will become apparent in the following detailed description taken in connection with the accompanying drawings in which:

FIG. 1 is a perspective view of a thread-forming screw constructed in accordance with the preferred embodiment of the invention.

FIG. 2 is a fragmentary side view of an unthreaded blank showing a cylindrical straight or shank section and a conical tapered lead-in section.

FIG. 3 is an end view of FIG. 2 showing the frusto-conical tapered lead-in section.

FIG. 4 is a side elevational view of the threaded fastener shown in FIG. 1.

FIG. 5 is another partial isometric view of the fastener shown in FIG. 1 and particularly showing the tapered lead-in section with a concavity in the first thread of the straight section.

FIG. 6 is an end view of the tapered lead-in section of the fastener shown in FIG. 1.

FIG. 7 is a fragmentary, side elevational view of another embodiment of the invention having fully crested threads on the straight section and underfilled threads on the tapered lead-in section.

FIG. 8 is a reduced-in-size isometric view of the tapered lead-in portion of the fastener shown in FIG. 7.

FIG. 9 is a side view of another embodiment of the invention of a so-called spaced or slow thread fastener showing a root or minor diameter section between the spaced thread with underfilled threads in the tapered lead-in section.

FIG. 10 is an end view of the fastener of FIG. 9.

FIG. 11 is an end view of another embodiment of the invention in which four concavities are provided on the tapered lead-in section separating four thread-forming lobes for each pitch of the tapered lead-in section.

FIG. 12 is a perspective view of a roll threading die having an insert for forming concavities and lobes in the thread-forming portion of the die and constructed in accordance with the preferred embodiment of the invention.

FIG. 13 is an end view of a pair of roll threading dies forming the fastener shown in FIG. 1.

FIG. 14 is a top view of the threading dies in the process of rolling a thread on the blank shown in FIG. 2.

FIG. 15 is an enlarged isometrical view of the insert for the thread rolling die used to form the concavities and spaced lobes for the fastener shown in the foregoing figures.

FIG. 16 is a diagrammatic enlarged fragmentary view looking at the top of a blank as it is in its first stages of being formed with lobes and concavities therein.

As shown in the drawings for purposes of illustration, the invention is embodied in a thread-forming screw 11 of FIG. 1 having an elongated generally cylindrical shank or body section 12 with a tapered pilot or thread-forming end 14. At the opposite end of the screw is formed a means 15 for turning the screw such as, for example, a hex head 16 although a slotted screw thread or other means may be used for driving the screw. The threaded body preferably is formed with a continuous helical thread 18 having constant inner and outer diameters from the first thread 20 adjacent the leading end section to the last thread 22 so that when the screw is fully threaded into the workpiece it provides a full thread grip because of the full engagement between the threads 18 and the workpiece. The threads are formed in the workpiece by the tapered thread forming end 14 which has one or more thread forming pitches or threads having a plurality of uniformly spaced lobes or thread sections 25.

In accordance with an important aspect of the invention, the present invention uses the low-cost, conventional blanks 24, such as that shown in FIG. 2, which have the cylindrical shank portion 26 into which will be formed the helical thread 18 and also which have a frustoconical cross section leading end or tip 27 which has a right cross section which is circular in shape. This is in contrast to the more expensive blanks which have a polygonal shape formed in the lead-in, thread forming end such as by extruding or blanking the same to provide flats therein or to form a trilobular cross section. Other fasteners have a trilobular shank and lead-in section. In these fasteners, the threads will not be full threads, but will be interrupted threads, which do not provide the tensile force derived from the full threads of the fastener shown in FIG. 1.

In accordance with the present invention, a conventional low-cost blank 24 having a frustoconical lead surface 28 of circular cross section and a cylindrical shank is rolled between a pair of thread rolling dies to form the continuous helical thread 18 on the shank and a polygonally shaped thread forming section 14 defined by concave relief areas or sections 33 smoothly blended by curved ramp surfaces 34 into adjacent forming lobes 25. The concave relief areas 33 actually are depressions formed by displacing metal from the conical surface 28 of the tip 27 at locations between the thread forming lobes 25 to provide radially inwardly extending reliefs. When rolling the concavities 33 in the blank's conical surface 28, metal is forced from this conical surface radially outwardly and circumferentially to form the adjacent and associated lobes 25 leaving depressions between the lobes thereby providing a polygonal cross section for the lead-in section 14. Preferably, three concavities 33 are formed for each pitch in the lead-in section to space the three lobes 25 in each pitch thereby providing a cloverleaf shape for the polygonal cross section as best seen in FIGS. 1 and 5.

The curved ramp surfaces 34 are formed to blend smoothly at the intersections of the concave surfaces with their adjacent convex lobe surfaces to allow the metal being rolled and scooped from the conical surface 28 of the blank 24 to be rolled outwardly into a lobe 25 and to form the lobe 25 with a reduced amount of force than would be required if sharp interfaces were present at the intersection of the concave surfaces of the concavities 33 and the convex surfaces of the lobes 25. As best seen in FIGS. 1, 4 and 5, the transition ramp surfaces have a tapering width from the sharp crests 40 on the lobes 25 to the wider concave surfaces defining the bottoms of the concavities 33. During formation of a thread in a workpiece, the workpiece metal will also be rolled by the lobes 25 across the transitional ramp surfaces 34 and into the relief concavities 33 thereby providing relief and requiring less torque to form the thread.

With the present method, the need to have a preformed polygonal cross section on the tapered lead-in section 14 is avoided and likewise a convex surface between the lobes is also avoided.

Thus, the forming of the polygonal shape for the thread-forming section 14 occurs in the roll thread dies without any prior reshaping of the conical lead-in section 14 or without the use of a special polygonal cross section blank which is a more expensive blank than the conventional blank illustrated in FIG. 2. Herein, it is preferred also to form a concavity 33F, as best seen in FIGS. 1 and 4, in the first full diameter thread 20 of the straight shank of continuous helical thread 18. This aids in the transition between the thread forming lobes and the helical continuous thread 18 of constant outer diameter.

As will be explained in greater detail hereinafter in conjunction with other embodiments of the invention, the lead-in lobes 25 may be fully formed with sharp crests or they may be unfilled with flat crests thereon.

Also, the end 37 of the fastener may be left circular in shape, as on the blank 24, if desired to facilitate centering of the screw in the preformed hole, as will be described hereinafter in greater detail in connection with the fasteners shown in FIGS. 7 and 8.

Referring now in greater detail to the specific embodiment of the invention shown in FIGS. 1, 4, 5 and 6, the fastener 11 is formed with three thread-forming lobes 25 in each pitch with three full pitches or threads being provided in the tapered thread forming section 14. Manifestly, the number of pitches or threads in the section 14 may be varied from that shown and described herein. Also, as will be apparent from FIGS. 1, 4, 5 and 6, the circumferential extent of each concavity increases in the direction from the tip end towards the first thread in the straight section 20. Likewise, the circumferential extent of the thread forming lobe also increases for each of the three pitches with the smallest circumferential extent for the lobes being for the first lobes 25 nearest the end 37 of the fastener. As can be readily seen in FIGS. 1, 4, 5 and 6, these concavities are aligned with each other in the longitudinal direction of the screw and likewise each of three lobes 25 for the three respective lead-in pitches or threads are also aligned with one another in the longitudinal direction of the screw. Preferably, the lobes 25 are sharp crested with sharp outer edges or crests 40 which provide an easier forming edge for forming through the metal. The sharp crests 40 are at the outer intersection of opposite sloping side walls or flanks of the thread 42 (FIG. 4). Each sloping side wall 42 meets another side wall at its inner end to define a root 44 for the thread.

Likewise, in this preferred embodiment of the invention, the continuous helical thread 18 is sharp crested with a crest 48 formed at the juncture of a pair of sloping side walls 50, the latter joining adjacent sloping side wall 50 at an inner root 51. As is conventional with roll formed threads, the root diameter is less than the diameter of the shank 26 of the blank and the maximum diameter of the thread is greater than the diameter of the shank 26. In this embodiment, the lobes 25 and concavities 33 continue all the way to the screw end 37 to define the polygonal shape of a cloverleaf, as can readily be seen in FIGS. 1, 5 and 6.

The preferred embodiment, as illustrated in FIGS. 1-6, is that of a cloverleaf cross section in which very smooth curved ramp surfaces 34 which are transition surfaces between the concave surfaces of the concavities 33 and the convex surfaces of the lobes 25. These smooth transition ramp surfaces 34 allow the metal in the blank to be extruded by a rolling action from the blank and rolled and forced outwardly to form an adjacent lobe 25 as the thread forming die moves relative to the blank. If there were an abrupt angle or very sharp shoulder between the lobe 25 and the concavity, the blank would not smoothly roll relative to the thread forming dies and form the polygonal shape in the lead-in section with radial relief concavities 33 therein. This action of the rolling dies will be explained in greater detail hereinafter. The smooth curved ramp surfaces 34 also are important in the thread forming action in a workpiece as they allow the workpiece metal to be rolled and pushed by a lobe 25 into an adjacent concavity 33 in a smooth manner thereby providing a radial relief without an abrupt transition. The curved ramps 34 also combine with the convex lobes to form rounded and smooth leading and trailing edges for the lobes thereby avoiding abrupt edges which will gauge or dig into the workpiece metal and increase the driving torque required to drive the screw into the workpiece. Further, the smooth transition provides a structure which doesn't have metal therein which is liable to break off and leave chips or debris, which is undesirable in electrical applications.

In accordance with another embodiment of the invention which will be described hereinafter in connection with FIGS. 7, 8 and 10, the thread forming lobes 25a are underfilled or flat at their crests 40a. Also, the polygonal cross section has not been extended to the very end 37a of the lead-in section 14. That is, the thread is not formed fully into the end surface 37a which is left a circular shape which is the shape for the end of the screw blank, as shown in FIG. 2. Reference characters with a suffix "a" added thereto will be used to identify elements in FIGS. 7 and 8. In some instances, a circular end is desired to assist in locating the screw 11a in a straight position when entering the hole in a workpiece. That is, when polygonal shape continues all the way to the end, the person inserting the screw into the preformed hole may abut the leading lobe and tilt or cant the screw relative to the workpiece; and then the screw continues to be canted when it is driven fully into the workpiece. As best seen in FIG. 7, the flat crests 40a on the lobes 25a are of progressing width with the greatest width crest being in the first lobes for the first pitch at the smallest end of the lead-in section 14. Herein, the first continuous thread 20a of the helical thread 18a is sharp crested. The remainder of the helical thread 18a on the straight shank portion is sharp crested. As will be explained in greater detail hereinafter in connection with the method of making the fastener 11a, shown in FIGS. 7 and 8, the radial relief concavities 33a between adjacent lobes 25a may be controlled as to its depth and width. In any event, each of the concavities 33a between the adjacent lobes is aligned with one another in axial direction, as can readily be seen in FIGS. 7 and 8. Preferably, for the fasteners shown in FIGS. 7 and 8, concavities 33a become larger in circumferential extent in the pitches progressing from the end 37a toward the helical thread 18a. As the threads or lobes increase in diameter in the thread forming section, we progressively increase the polygonal shape. This can also be readily observed in FIG. 10 which is an end view of the screws shown in FIGS. 7 and 8.

Referring now to another embodiment of the invention, which is disclosed in FIG. 9, a slow or spaced thread screw 11b which has its helical thread 18b in which the individual thread side walls or flanks of the thread 50b are spaced from each other by a wide root surface 61. The side walls 50 for the helical thread 18 in the FIG. 1 embodiment and the side walls 50a for the FIG. 7 embodiment are preferably at angles of standard machine screw, namely, at angles of 60 degrees with one another. On the other hand, with the slow type thread, the angles formed between the sides with each other can be less than 60 degrees and are often 40 degrees or less. The lesser angle however, poses an increase in manufacturing costs because of the considerable amount of metal forming being done causes a decrease in the life of the roll thread dies being used to make the sharp thread of a lesser angle.

Preferably, for the slow thread screw 11b (FIG. 9), the lobes 25b in the lead-in section 14b are underfilled, although it is possible to produce a full sharp crest for the lobes 25b. The underfilled crest is produced with a flat standard type roll thread die. As explained above, the lobes 25b may terminate short of the end of the lead-in section 14b leaving a rounded end surface or the lobes 25b may be extended to the screw end to form a polygonally shaped end. As with the screws previously described, the concavities 33b between each of the adjacent lobes 25b extends into what was the conical surface 28 of the blank before forming the lobes 25b from the material displaced from the concavities as well as other adjacent metal. The third such concavity extends into the beginning of the first full size screw thread having a sharper crest, as shown for the third screw thread at the bottom side of FIG. 9.

The number and size of the lobes 25 and concavities 33 may be varied from the trilobular configuration described above. For example, in accordance with another embodiment of the invention, a fastener 11c (FIG. 11) is formed with a lead-in section 14c having four lobes 25c for each pitch and having four concavities 33c for each pitch spacing the respective lobes in that pitch. This is in contrast to the trilobular configuration which is shown for the slow screw thread in FIG. 9 and for the first embodiment of the invention, as shown in FIGS. 1–6. Thus, it will be seen that the present invention is not construed to be limited to a trilobular configuration as the number of lobes and concavities may be varied. In the embodiment shown in FIG. 11, the concavities 33c are spaced at 90 degrees from each other and likewise the lobes are spaced on 90 degree centers from one another in contrast to the 120 degree center spacing for the lobes and concavities described in the previous embodiments of the invention. In the embodiment of the invention shown in FIG. 11, the screw end 37c of the lead-in section 14c is polygonal in shape with small radially inwardly directed concavities 33c and at least one convex radially outwardly extending lobe therein. Manifestly, the end 37c could be left circular such as the circular end 37a (FIG. 8) for the fastener 11a. As will be explained in greater detail hereinafter, whether the lead-in section 14 is polygonal or circular in shape is dependent upon the angle of the forming tool insert or the amount that the forming tool is penetrating the blank in the thread rolling process. If the tool or insert is set at an angle or depth such that it does not penetrate, the end 37 or smallest diameter of the conical lead section of the blank, the rounded end of the blank will be left on the lead-in section.

Turning now to the preferred apparatus and method of manufacturing from a conventional blank 24, a thread forming screw 11 having the tapered polygonal lead-in section 14 with lobes 25 smoothly blended by curved ramp surfaces 34 into radial relief concavities 33, the preferred method includes the following steps: forming the polygonal cross section on the tapered lead-in section by rolling the tapered or conical surface 28 on the blank between a pair of thread rolling dies 70 and 71 (FIG. 14) which force metal outwardly as by means of a convex surface 73, as best seen in FIG. 16, and into an upwardly projecting lobe 25 which fits within an inwardly extending cavity 75 while rolling a screw thread 18 on the straight shank 26 between conventional longitudinally extending roll forming surfaces 77 and 78 on the respective thread rolling dies 70 and 71.

In the preferred method of rolling the fastener, the surfaces 73 and 75 for forming the lobes and concavities in the tapered lead-in section 14 are preferably disposed intermediate the ends of the movable thread roll forming die 70 so that the blank 24 does not begin to skid when the concavities 33 are being formed therein. Herein, the surfaces 73 and 75 are formed on a separate block shaped insert 80 which is mounted in a slot cut into the lower portion of a conventional thread roll forming die 70. By centrally locating the insert 80 in a longitudinal extent of the die, the helical screw 18 will have been partially formed by the die surfaces 77 and 78 as will slight screw threads be formed in the conical end of the blank before the latter arrives at the insert 80, a good gripping action is obtained on the blank so that the metal may be rolled outwardly into a lobe from a concavity without a shifting or skidding of the blank which would interfere and cause an imperfect product.

Turning more specifically to the construction of the moving die 70 except for the insert 80, it is preferably formed in the conventional manner with the conventional screw thread die surface 77 for forming the helical thread in the straight shank and for forming a helical thread in the conical end of the blank. These grooved forming dies have grooves 83 (FIGS. 12 and 13) extending at a slant and generally longitudinal of the die and a series of such grooves 83 extend the whole height of this particular moving die 70. Likewise, cooperating grooves 84 on the stationary die 71 are formed in a conventional manner and are similar to and cooperate with the grooves 83 to form the helical thread. The lowermost ones of the grooves 83 and 84 initially form a continuous helical thread in the conical end of the blank and then serve to complete the formation of the side walls of the lobes 25, the root diameter portion, and the shape of the crests of the lobes.

The insert 80 functions to roll the concavities 33 and the ramp surfaces 34 into the lead-in section 14. Herein, a series of convex surfaces 73 extend vertically along the outer sides of upwardly tapering columns 86 (FIG. 15) which have wider bases 87 and narrower tops 89. The convex surfaces 73 are preferably formed with a constant radius throughout the height of the column from their lower bases 87 to the tops 89 of the columns. That is, the arcuate extent of convex surface 73 is much greater at the base 87 than at the tops 89 of the columns. Preferably, the arcuate extent decreases uniformly in the upward direction. The convex surface columns serve to form the concavities 33.

The formation of the lobes 25 is caused by the concave surfaces 75 which are formed on and define concave columns 90 on the insert between adjacent convex columns 86. The concave columns 90 are formed with a larger arcuate extent at their upper ends 92 than at their lower ends 93. The same radius of curvature extends throughout the length of the concave column, the only difference being the arcuate extent of the concave surface being wider at the top and narrower at the bottom. As can best be seen in FIGS. 15 and 16, the concave columns 90 have a larger radius of curvature for their concave surface 75 than the radius of curvature used for the convex surfaces 73 therebetween.

The ramp surfaces 34 are formed, as best seen in FIG. 16, between the convex surfaces 73 and the concave surfaces 75 and are formed by a curved surface 95 on the insert 80. The curved surfaces 95 are formed to eliminate a sharp interface at the juncture of adjacent concave surfaces 75 and convex surfaces 73, which would be the case except for a blending and smoothing of this juncture area by the curved surface 95. The curved surfaces 95 are desirable to eliminate abrupt or sharp edges between the lobes 25 and concavities 33.

Thus, when forming the concavities, metal from the tapered blank surface 28 may be easily and continually forced and rolled radially outwardly into a lobe across a smooth ramp surface 34 leading to a lobe 25. When the lobes 25 are forming a thread in a workpiece, the ramp surfaces 34 provide a smooth lead-in surface to the concave relief surface to allow the metal in the workpiece to be rolled into the concavity and thus give relief to the metal being displaced by the lobe.

To shape the lobes 25 and concavities 33 more easily and with good surface characteristics it is preferred that the leading three concave columns 90 engaging the blank be slightly less deep than the last three concave columns 90 and likewise that the leading three convex columns 86 project outwardly slightly less than the trailing three columns so that not all of the metal need be rolled within the first revolution of the blank relative to the insert 80. Thus, the lobes 25 and concavities 33 will be substantially formed in the first revolution and some slight additional metal will be displaced by the three trailing convex and concave columns to form a more finished form for the lobes and cavities.

The insert 80 is preferably a block-shaped piece having horizontal top and bottom walls 96 and 97 and being sized to fit snugly in a recess 98 cut into the movable die 70 with the bottom wall 97 of the insert being coplanar with the bottom wall of the die 70. The front face of the insert having the convex and concave columns therein is set at an angle to the vertical, as best seen in FIG. 13, to accommodate the tapered end 27 of the blank 24 being rolled. The sloped angle of the insert face to the vertical may be varied but preferably is about 4°. The angle of the insert face may be changed to accommodate the angle of the conical lead-in surface 28 as this latter angle varies depending upon the number of threads desired in the lead-in section. Also, the extent of the angle of the insert face will determine whether or not the convex and concave columns will engage the tapered end of the blank all of the way into the end wall 37 to form concavities extending into the end wall 37 to change its shape from circular to trilobular, as shown in FIG. 1.

The tops of the convex columns 86 form the concavities in the first full thread 20 of the continuous helical thread 18. To prevent formation of a sharp demarcation line as the fasteners formed by the upper ends of the concave and convex columns 90 and 86, the top ends of each of these columns is formed with a slightly downward and outward inclined surface beginning at edge 99 (FIG. 15) and extending across the tops thereof. Stated differently, the tops of the columns 86 and 90 are radiused by grinding down slightly their uppermost edges.

With the insert 80 in one of the dies 70 and 71 and a blank 24 inserted between the dies, the continuous thread 18 can be rolled and the lobes 25 and concavities 33 can be rolled into the conical end 27 of the blank. Preferably, the insert is positioned intermediate the ends of the die 70 so that a spiral lead-in thread and a portion of the thread 18 will already have been started before reaching the insert 80. After formation of the lead-in lobes 25, the spiral thread 18 will be finished and the thread forming grooves on the dies 70 and 71 will continue to shape the lobes 25 to their sharp crests, etc., in a well known manner. The formation of the unfilled crests 25a (FIG. 7) is made by using dies having grooves and ridges which do not push the metal into sharp point crests for the lobes formed by the insert 80. It will be appreciated that the grooves and ridges on the lower part of the die 71 will form the spiral shape for the lobes 25 and form the flanks 42 and the root 44 for the lead-in section thread.

The width of the convex and concave columns 86 and 90 may be such that three concave columns are provided for one revolution of the blank to form three lobes per pitch of the lead-in screw thread or such that four concave columns 90 are operative per revolution of the blank to form the four lobes 25c shown in FIG. 11. Manifestly, the number of lobes may increase to 5, 6, 7, 8 etc. depending upon the user's needs, e.g. with larger diameter holes more lobes per pitch may be desired.

While flat thread rolling dies have been illustrated and described herein, it is to be appreciated that the present invention is not limited thereto as planetary thread rolling dies may be provided with means to form the alternating lobes and concavities in the lead-in section.

From the foregoing, it will be seen that the present invention provides a self-thread creating fastener from a conventional blank with concavities in the conical thread forming end providing radial relief between thread forming lobes. The concavities and lobes are rolled with an apparatus and with a method which does not require the pre-working of the conical end of the blank to form a polygonal cross section therein, thereby providing an inexpensive fastener. A full complete helical thread on the straight shank provides better holding power than the trilobular shank having interrupted threads.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A method of manufacturing a thread forming screw having a frusto-conical lead-in section having a tapered surface with lobes thereon and with a polygonal cross section and having a helical thread on a straight shank section comprising the steps of: forming the polygonal cross section on said tapered lead-in section by rolling the tapered surface between a pair of thread rolling dies to force metal outwardly from the tapered surface to leave concavities therein and to force the displaced metal from the concavities radially outwardly and circumferentially into upwardly projecting thread forming lobes to provide alternating thread forming lobes projecting above the formerly tapered surface and inwardly extending cavities extending radially inwardly of said formerly tapered surface, and rolling a screw thread on said straight shank during the same rolling operation that rolls said polygonal cross section on said frusto-conical lead-in section.

2. A method in accordance with claim 1 in which the rolling operation comprises beginning to form the helical screw thread on said straight section and on the frusto-conical end and then displacing metal from said frusto-conical end to form into said polygonal section with lobes thereon and then finishing the rolling of said helical thread and said lobes.

3. A method in accordance with claim 2 in which the rolling of said concavities and said lobes comprises alternating rolling of said metal from a cavity radially outwardly into an adjacent lobe for as many cavities and lobes as are present for a thread pitch on said tapered lead-in section and then providing additional alternating rolling operations to finish forming said lobes and concavities in said lead-in section.

4. A method in accordance with claim 3 in which the right circular end of said blank remains clear of said rolling dies forming said concavities and lobes thereby leaving a circular end for said screw.

5. A method in accordance with claim 4 including the step of rolling at least one concavity into at least the first thread on said straight shank adjacent to said lobes on said lead-in section.

6. A method in accordance with claim 1 in which curved ramp surfaces are rolled between said convex lobes and said concavities to eliminate sharp interfaces between the convex lobes and the concavities.

7. A method in accordance wth claim 5 including the step of rolling three concavities for each thread pitch on said tapered lead-in section to define a cloverlead polygonal cross section for said lead-in section.

8. In an apparatus for manufacturing a thread forming screw from a blank having a cylindrical shank and a frusto-conically shaped lead-in section having a tapered surface at one end of said shank, said apparatus having a pair of thread rolling dies having rolling surfaces thereon for forming a helical thread on said straight shank; an improvement comprising means on said rolling dies for forcing metal from said tapered surface section radially outwardly to form concavities therein and to force metal from said concavities radially outwardly into projecting lobes alternating with said concavities to provide a polygonal cross section for said tapered lead-in section with lobes thereon.

9. An apparatus in accordance with claim 8 in which said die has grooves extending substantially in the direction of rolling movement and in which said means on said thread rolling die comprises alternating concave and convex columns with the convex columns forming said concavities and said concave columns forming said lobes, said columns being disposed transversely of said rolling surfaces forming said helical thread on said straight section.

10. An apparatus in accordance with claim 9 in which smoothly curved ramp surfaces smoothly join said convex columns with said concave columns to form smooth ramps between said lobes and said concavities in said tapered lead-in section.

11. An apparatus in accordance with claim 8 in which said concave columns have a progressively increasing width in one direction and said convex surfaces have a progressively increasing width in the opposite direction.

12. An apparatus in accordance with claim 8 in which said columns are formed on one die and are inclined at a small angle to vertical and project inwardly toward the opposite thread roll die.

13. An apparatus in accordance with claim 8 in which said means on at least one of said rolling dies comprises a centrally located insert therein having alternating concave and convex surfaces extending in a direction substantially transversely of the direction of the surface forming the helical thread, said concave and convex surfaces being located on said moving die.

* * * * *